Jan. 3, 1928.
R. CRAIG
1,655,386
APPARATUS FOR MEASURING SPACE DIMENSIONS OF OBJECTS
Filed March 15, 1923      3 Sheets-Sheet 1
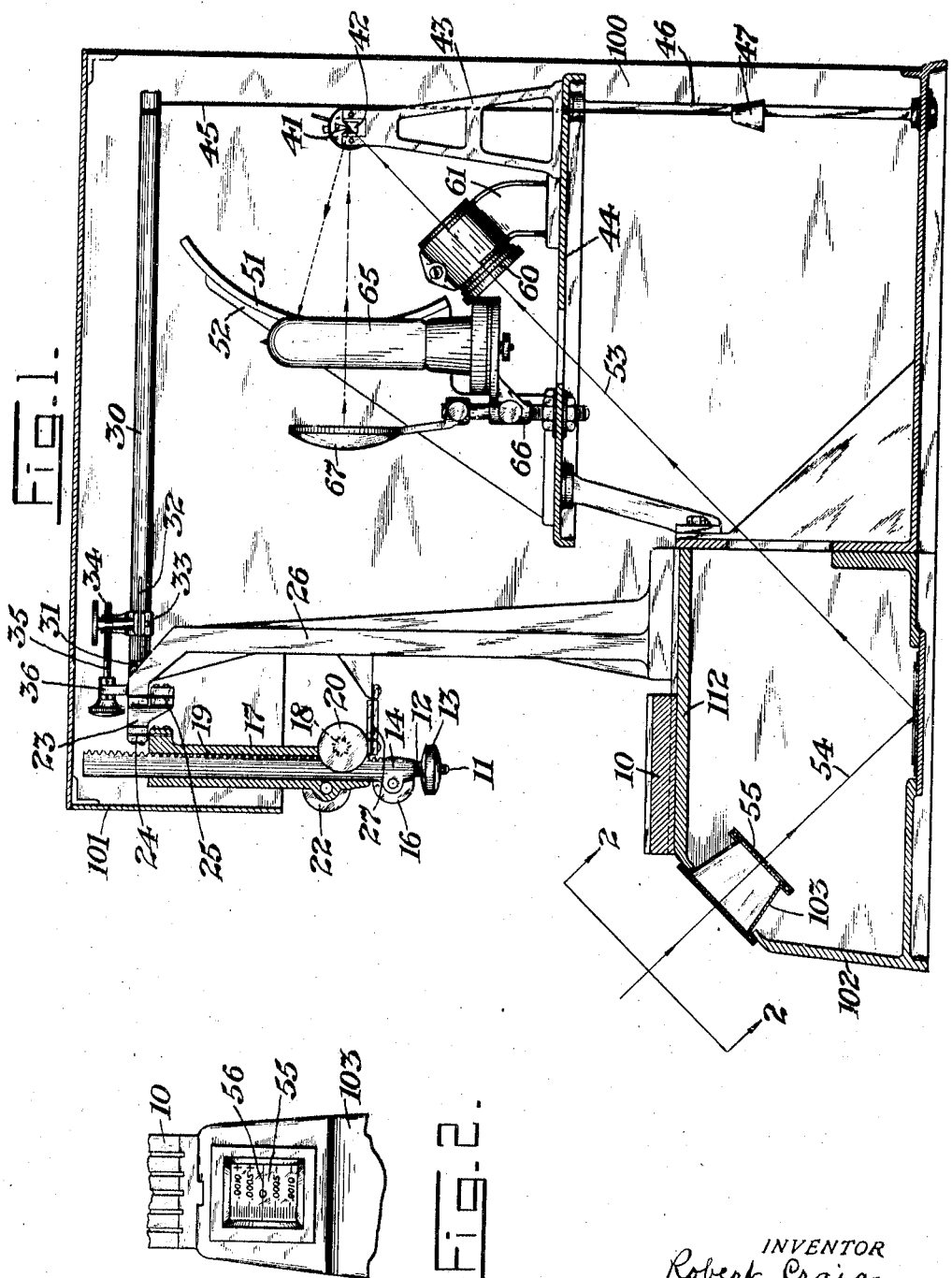
INVENTOR
Robert Craig
BY
Cooper, Kerr + Dunham
ATTORNEYS

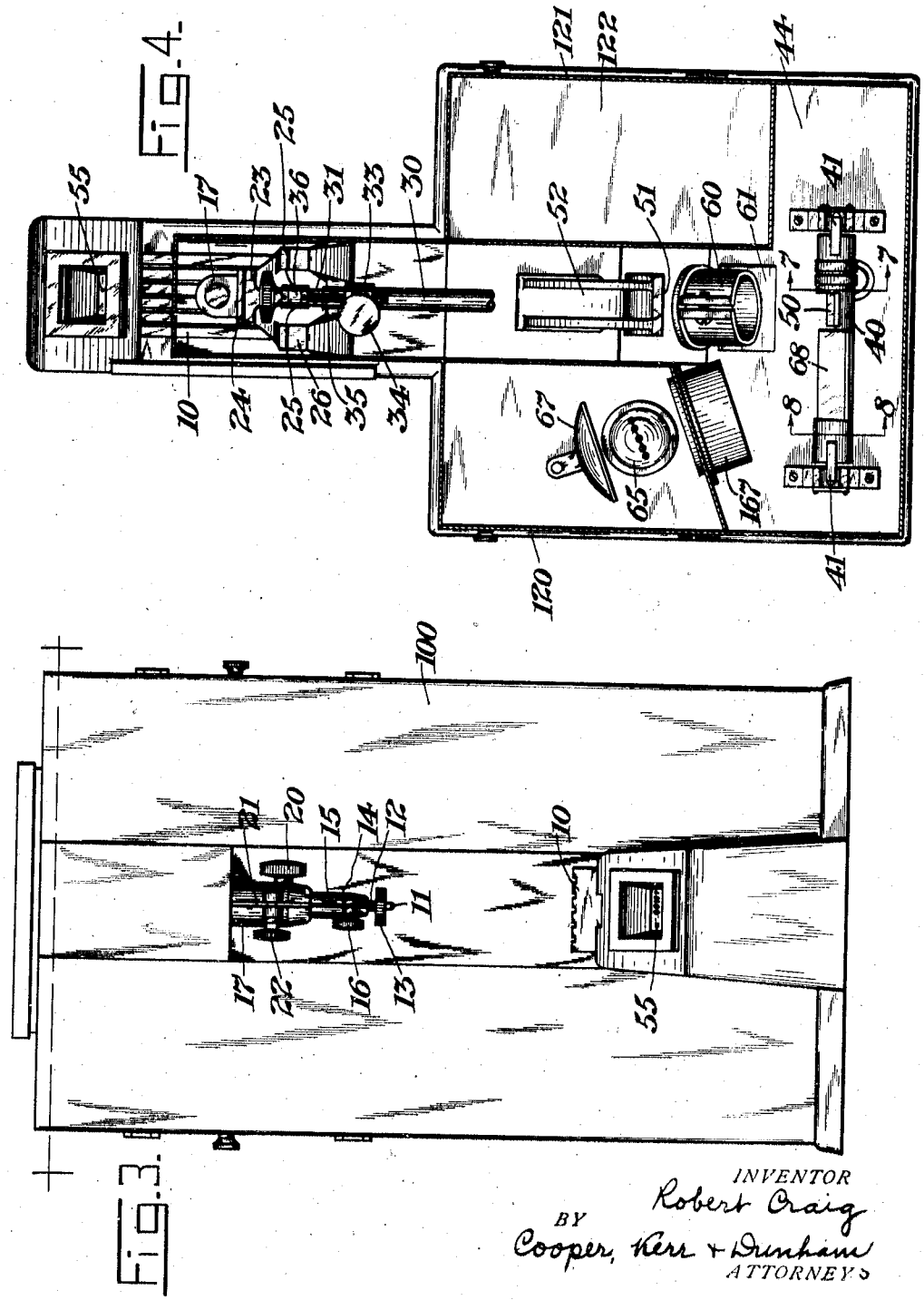

Jan. 3, 1928.
R. CRAIG
1,655,386
APPARATUS FOR MEASURING SPACE DIMENSIONS OF OBJECTS
Filed March 15, 1923     3 Sheets-Sheet 3
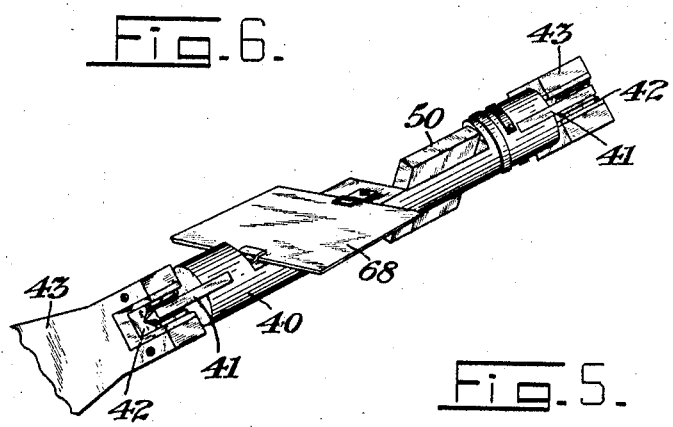
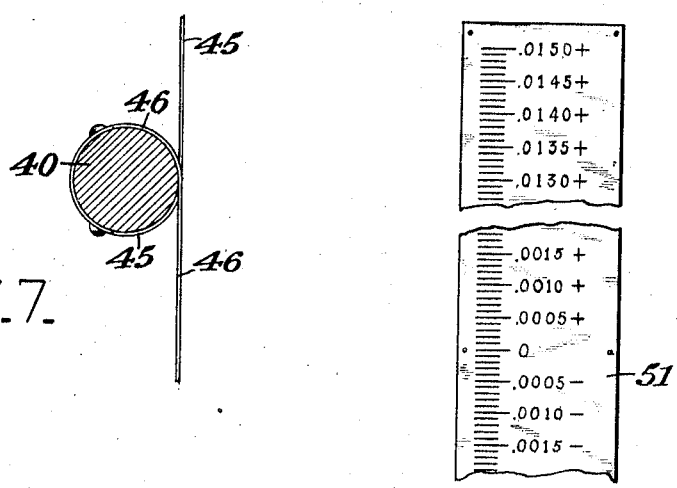
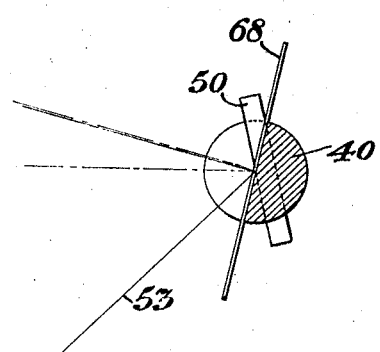
INVENTOR
Robert Craig
BY
Cooper, Kerr & Dunham
ATTORNEYS Patented Jan. 3, 1928.

1,655,386

UNITED STATES PATENT OFFICE.

ROBERT CRAIG, OF DAYTON, OHIO.

APPARATUS FOR MEASURING SPACE DIMENSIONS OF OBJECTS.

Application filed March 15, 1923. Serial No. 625,288.

This invention relates to apparatus for measuring space dimensions of objects. More specifically it relates to apparatus for measuring space dimensions with a high degree of accuracy.

One of the objects is to provide an apparatus of the class above mentioned which is highly accurate yet comparatively easy to operate.

Other objects are to provide an apparatus of the class above mentioned which is substantially free from friction, backlash, parallax, and other error-introducing objections, which exerts a substantially uniform, and preferably adjustable, pressure upon the objects measured, in which objects of comparatively widely differing dimensions may be measured, which has a comparatively wide range of reading, which may be operated quickly, which may be read with facility, and which may be manufactured at a reasonable cost. Other objects and advantages will appear as the invention is hereinafter disclosed.

Referring to the drawings which illustrate what I now consider a preferred form of the invention:—

Fig. 1 is a side elevation, partly in section, of one form of apparatus.

Fig. 2 is a fragmentary detail view looking in the direction of the arrows 2—2 in Fig. 1.

Fig. 3 is a front elevation of the apparatus.

Fig. 4 is a plan view partly in section.

Fig. 5 is an enlarged detail view of one form of chart.

Fig. 6 is a detail perspective of one of the oscillatable members and reflectors connected thereto.

Fig. 7 is a detail cross-section taken substantially on the line 7—7 of Fig. 4.

Fig. 8 is a detail cross-section taken substantially on the line 8—8 of Fig. 4.

The apparatus illustrated comprises a plurality of elements 10, 11, which are relatively movable and between which the objects to be measured are placed. In the present case the element 10 is shown fixed and the element 11 adjustable toward and away from the element 10. The element 10 is shown in the form of a table or anvil which may be replaced by other forms of tables or anvils in the use of the apparatus. The element 10 is mounted upon the plate 112 forming a part of the frame of the apparatus. The element 11 is shown in the form of a rounded contact button forming a part of a screw 12 adapted to be screwed into and out of the lower end of a plunger 14 which is suitably tapped for that purpose. The screw 12 may be turned with respect to the plunger 14 by means of a wheel 13 secured to said screw. The lower end of the plunger 14 is shown slotted at 15 (see Fig. 3) and provided with a set screw 16 by means of which the diameter of the lower threaded end of the plunger may be contracted so as to grip the screw 12 securely in various positions of adjustment. The plunger 14 is shown slidably mounted in a sleeve 17 upon which is journaled a pinion 18 which meshes with rack teeth 19 provided on the plunger 14. By turning a wheel 20 secured to the shaft of the pinion 18 the plunger 14 may be moved up or down with respect to the sleeve 17. The sleeve 17 is shown slotted at 21 and provided with a set screw 22 whereby the diameter of the sleeve may be varied to permit relative sliding movement of the sleeve 17 and plunger 14 or to grip the plunger and hold the sleeve and plunger in any desired position of relative adjustment.

The sleeve 17, and parts carried thereby, are preferably suspended from a lever 23 by means of a flexure plate 24 and the lever 23 is preferably fulcrumed or pivoted for oscillatory movement about a horizontal axis by means of flexure plates 25, each secured at one end to said lever and at the opposite end to a bracket or fulcrum stand 26. The fulcrum stand 26 is shown conveniently secured to the base plate 112. In order to insure that the sleeve 17 and plunger 14 shall hang vertically in various positions of the lever 23, or, in other words, to insure that the sleeve 17 and plunger 14 shall move parallel to themselves, I prefer to provide a check link 27 of the plate type commonly employed in the weighing scale art. The check link 27 is of such design, with respect to the lever arm 24—25, and so connected to the sleeve 17 and stand 26 as to cause the various positions of the sleeve and plunger 14 to be parallel to each other.

The other end of the lever 23 is preferably constructed so as to be adjustable to vary the lever arm. Thus the arm 30 is shown constructed of tubular material and adapted telescopically to engage the cylindrical portion 31 of the lever 23. The tubular arm 30 is shown slotted at 32 and provided with a split collar 33 secured to said arm 30. By virtue of a set screw 34, the collar 33 may be contracted or expanded to hold the parts 30—31 in adjusted positions or to release them for relative sliding movement. Relative adjustment of the parts 30—31 may conveniently be effected by turning a screw 35 journaled at 36 on the lever portion 31 and which screw 35 screws into a suitably tapped opening in the collar 33.

It will be noted that any small vertical movement of the element 11 will cause a large though proportional movement of the free end of the arm 30 so that the means connecting the free end of the arm 30 and the element 11 constitute a multiplying mechanism. In the particular machine illustrated the multiplying factor is substantially "15". The movement of the free end of the lever arm 30 is employed to actuate the indicating means, which may assume other forms but which is illustrated in now preferred form in the drawings and constructed substantially as follows.

A cylindrical member or shaft 40 is oscillatably mounted by means of knife edged members 41, 41 secured thereto and resting in jewel or other suitable bearings 42, 42 provided on a fulcrum stand 43. The latter is secured to and supported by a base plate 44 forming a part of the framework of the apparatus. The line of the knife edges is preferably horizontal. The member 40 has secured to it one end of a tape 45 of metal or other suitable material and of which the other end is secured to the free end of the arm 30 of the lever 23. A similar tape 46 is shown secured at one end to the member 40 and connected at its other end to a counterweight 47. The design is preferably such that the parts carried by the short arm of the lever 23 are heavy enough to overbalance slightly the weight of the lever 30, tapes 45, 46 and counterweight 47.

By virtue of the structure above described the downward pressure exerted by the element 11, upon an object placed beneath it, is practically uniform for various and widely different positions of said element with respect to the element 10. It will be noted further that any vertical movement, however small, of the element 11 will be multiplied and imparted to the member or shaft 40 without any lost motion or backlash.

The shaft 40 has secured thereto a plane reflector 50. Preferably, to avoid double images, the front surface—i. e. the surface most remote from the shaft 40—of the reflector 50 is employed as the reflecting surface. This may be effected by constructing the reflector of suitable light-reflecting metal or, if the reflector is glass, by silvering the front instead of the rear surface. The mounting of the reflector 50 on the shaft 40 is such that the axis of oscillation of the shaft, i. e. the line of the knife edges, lies in the plane of the reflecting surface. A chart 51 is provided in such position that images of the indicia thereof will be reflected by the reflector 50. Preferably the chart 51 is made in the form of a part of the curved surface of a cylinder having its axis coincident with the axis of oscillation of the shaft 40. The chart 51, so shaped, is shown secured to a bracket 52, in turn secured to the base plate 44.

Images of various portions of the chart 51 (dependent upon the position of the reflector 50) pass from the chart 51 to the reflector 50 thence along the line 53 to a stationary reflector, preferably of metal, and thence along line 54 to a screen 55 of ground glass or other suitable material. It will now be apparent that, if the chart 51 is properly illuminated, an image of the chart will appear upon the screen 55 and that upon movement of the reflector 50 about its axis, the chart will appear to move across the screen in a substantially vertical direction. For reading purposes the screen 55 is provided with a cross-hair or reading line 56 on its ground surface. It will be noted that when the mirror 50 turns through an arc the chart 51 will appear at cross-hair 56 as moving through twice that arc, thereby effecting a further effective proportional multiplication of the movement of the element 11. To facilitate reading and to make it feasible to employ a very finely calibrated chart 51, I prefer to employ a suitable projecting lens system 60 for projecting and magnifying the image of the chart 51 which appears upon the screen 55. This lens system may conveniently be mounted on a bracket 61 carried by the base plate 44, so as to lie in the path of the rays of light passing from the chart to the screen.

The particular indicia employed upon the chart 51 will depend upon the particular class of service to which the apparatus is to be applied. To illustrate the operation of the apparatus I have assumed in the present case that the apparatus is to be employed to measure the deviations of unknown objects from a standard of comparison, a use to which the apparatus is admirably adaptable, although it may be otherwise employed by changing the chart 51. As shown in Fig. 5 the chart is calibrated to positive and negative decimal fractions of an inch, the zero lying at the middle of the chart.

While other forms of illuminating means may be employed I prefer to provide means for automatically concentrating light upon, or intensely illuminating, that portion of the chart 51 which is reflected upon the screen 55. A preferred form of such means is illustrated and may be constructed substantially as follows.

A high intensity incandescent lamp 65 is mounted upon a bracket 66 in such position that rays of its light are concentrated upon a reflector 68, through a system of lenses or condenser 167, and from reflector 68 upon the chart 51. The intensity of the illumination may be aided by a curved reflector 67, also mounted on bracket 66. The reflector 68 is preferably constructed of light-reflecting metal and so mounted upon the shaft 40 that the axis of oscillation of the latter lies in the reflecting surface. The design and location of parts are such that, no matter what the position of the shaft 40 and its reflector 50 may be, the light passing from lamp 35 to condenser 67, thence through condenser 167 thence to reflector 68, and thence to the chart, will be focused upon that part of the chart 51 of which the image appears at the screen 55. In other words, no matter what the particular position of the shaft 40 may be, if a ray of light were passed along the line 53 upon the reflector 50 and thereby reflected upon the chart 51, the intersection of such ray of light with the chart would mark the spot intensely illuminated by the lamp 65, condensers 67 and 167 and reflector 68.

The apparatus above described is constructed and designed to operate substantially as follows. Assume that it is desired to measure the deviation of a number of objects from a standard dimension of say 2.250 inches. Suppose further that the permissible deviation or tolerance is plus or minus .005 inch. Standard blocks, such as Johansson blocks, having an aggregate thickness of 2.250 inches are placed upon the anvil 10. The plunger 14 is moved down in the sleeve 17, by turning the wheel 20, until the element 11 almost touches the top block. The screw 22 is now turned to cause the sleeve to grip the plunger 14 and hold the sleeve and plunger in the adjusted position. The wheel 6 is now turned to bring the element 11 into contact with the uppermost surface of the standard blocks and until the reading upon the screen 55 at the reference line 56 is zero. The screw 16 is then tightened to hold the parts 11 and 14 in the adjusted position. The standard blocks are now removed and the objects to be measured successively placed upon the anvil 10. The element 11 will rest upon each of such objects and the reading at the reference line 56 will indicate the plus or minus deviation of the particular object from the desired standard dimension.

It will be noted that the lever 23 and connected parts serve as a means for multiplying the displacement of the element 11 with respect to the element 10. A further multiplication is effected by the length of a ray of light passing from the axis of oscillation of the reflector 50 to the chart 51 and which, in effect, serves as a pointer. If desirable, this effective pointer length may be increased by placing the chart 51 farther away from the said reflector 50 or still further increased, without increasing the total size of the apparatus, by causing the said ray of light to pass from the chart 51 to a stationary mirror, thence to the reflector 50 and thence as shown in Fig. 1. It should also be noted that a further multiplication is effected due to the fact that the incident ray, which passes from the chart 51 to the axis of the reflector 50 and is thence reflected along line 53, moves through twice the angle through which the reflector 50 moves. In addition to these various multiplications, the image of the chart is magnified so that fine reading is facilitated.

By suspending any one of a desired number of weights 16 upon the tape 46, the delicacy of touch of the element 4 upon the objects measured or gaged may be controlled as desired. Once set, the pressure upon the object will be the same, whether the object be large or small, so long as the size of the object is within the range of travel of the element 11.

The particular apparatus illustrated is calibrated to ten thousandths of an inch but may easily be read to half ten thousandths.

The apparatus may conveniently be enclosed in a casing 100 having an upper forward extension 101 open at its lower portion and through which the sleeve 17 and plunger 14 project. The casing 100 is provided also with a lower forward extension 102 which carries the screen 55 and of which the plate 112 forms the top wall. Preferably the screen 55 forms one of the faces of a hollow frustrum of a pyramid or hood 103 to facilitate reading of the indications at the screen. The casing 100 may be provided with suitable doors such as the doors 120 and 121, of which the door 120 permits access to the lamp housing and the door 121 to a storage chamber 122.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim is—

1. An apparatus for measuring space dimensions of objects and comprising in combination, a plurality of relatively movable elements adapted to be placed in different relative positions in accordance with varying dimensions of objects being measured, a movable device, multiplying means fixedly connecting one of said elements to said device, and frictionless means for automatically multiplying and indicating displacements of said device.

2. An apparatus for measuring space dimensions of objects and comprising in combination, a plurality of relatively movable elements between which the objects to be measured are placed, a chart, and means controlled by relative movement of said elements and including optical instrumentalities for distinctively disclosing images of different portions of said chart in accordance with different relative positions of said elements.

3. An apparatus for measuring space dimensions of objects and comprising in combination, a plurality of relatively movable elements between which the objects to be measured are placed, a stationary chart, and means controlled by relative displacement of said elements for projecting images of different portions of said chart.

4. An apparatus for measuring space dimensions of objects and comprising in combination, a plurality of relatively movable elements between which the objects to be measured are placed, a stationary chart, a screen, and means controlled by relative displacement of said elements for projecting images of said chart upon said screen in accordance with different relative positions of said elements.

5. An apparatus for measuring space dimensions of objects and comprising in combination, a plurality of relatively movable elements between which the objects to be measured are placed, a chart, a reflector connected to and actuated by movement of one of said elements, and means for viewing images of said chart reflected by said reflector.

6. An apparatus for measuring space dimensions of objects and comprising in combination, a plurality of relatively movable elements between which the objects to be measured are placed, a chart, a screen, and means including a reflector connected to and actuated by movement of one of said elements for projecting images of said chart upon said screen.

7. An apparatus for measuring space dimensions of objects and comprising in combination, a plurality of relatively movable elements between which the objects to be measured are placed, a chart, means controlled by relative displacement of said elements for intensely illuminating different portions of said chart, and means for automatically disclosing an image of that portion of said chart which is so illuminated.

8. An apparatus for measuring space dimensions of objects and comprising in combination, a plurality of relatively movable elements between which the objects to be measured are placed, a stationary chart, means controlled by relative displacement of said elements for directing a beam of light upon different portions of said chart, and means for automatically disclosing an image of that portion of said chart which is so illuminated.

9. An apparatus for measuring space dimensions of objects and comprising in combination, a plurality of relatively movable elements between which the objects to be measured are placed, a movable reflector, multiplying means connecting one of said elements and reflector for imparting a comparatively large movement to said reflector upon comparatively small movement of said element, a chart, and means for viewing images of said chart reflected by said reflector.

10. An apparatus for measuring space dimensions of objects and comprising in combination, a plurality of relatively movable elements between which the objects to be measured are placed, a lever mounted for oscillation about a substantially horizontal axis and to which one of said elements is connected, a chart, a reflector connected to said lever, and means for viewing images of said chart reflected by said reflector.

11. An apparatus for measuring space dimensions of objects and comprising in combination, a plurality of relatively movable elements between which the objects to be measured are placed, a lever pivoted about a substantially horizontal axis and from which one of said elements is suspended, a chart, a reflector connected to said lever, and means for viewing images of said chart reflected by said reflector.

12. An apparatus for measuring space dimensions of objects and comprising in combination, a plurality of relatively movable elements between which the objects to be measured are placed, a movable member to which one of said elements is connected, a second movable member mounted for oscillation about an axis, a tape secured to said members, a reflector connected to said second member, a chart, and means for viewing images of said chart reflected by said reflector.

13. An apparatus for measuring space dimensions of objects and comprising in combination, a plurality of relatively movable elements between which the objects to be measured are placed, a movable member to which one of said elements is connected, a second movable member mounted for oscillation about an axis, a tape secured to said members, and image-projecting means controlled by said second member.

14. An apparatus for measuring space dimensions of objects and comprising in combination; a plurality of relatively movable elements between which the objects to be measured are placed, a lever pivoted about a substantially horizontal axis and from which one of said elements is suspended, an oscillatable member, a tape secured to said lever and member, and image-projecting means controlled by said member.

15. An apparatus for measuring space dimensions of objects and comprising in combination, a plurality of relatively movable elements between which the objects to be measured are placed, a lever pivoted about a substantially horizontal axis and from which one of said elements is suspended, an oscillatable member, a tape secured to said lever and member, a chart, a reflector connected to said member, and means for viewing images of said chart reflected by said reflector.

16. An apparatus for measuring space dimensions of objects and comprising in combination, a plurality of relatively movable elements between which the objects to be measured are placed, a chart, and means including an optical instrumentality controlled by relative movement of said elements for distinctively disclosing enlarged images of different portions of said chart in accordance with different relative positions of said elements.

17. An apparatus for measuring space dimensions of objects and comprising in combination, a plurality of relatively movable elements between which the objects to be measured are placed, a stationary chart, and means including multiplying connections controlled by relative displacement of said elements for projecting images of different portions of said chart.

18. The combination set forth in claim 11 in which the means for viewing the images of the chart comprises a screen upon which the images are projected.

19. The combination set forth in claim 15 in which the means for viewing the images of the chart comprises a screen upon which the images are projected.

20. An apparatus for measuring space dimensions of objects and comprising in combination, a plurality of relatively movable elements between which the objects to be measured are placed, a chart, means controlled by relative displacement of said elements for intensely illuminating different portions of said chart, and means controlled by relative displacement of said elements for disclosing an image of that portion of said chart which is so illuminated.

21. An apparatus for measuring space dimensions of objects and comprising in combination, a plurality of relatively movable elements between which the objects to be measured are placed, a stationary chart, means controlled by relative displacements of said elements for directing a beam of light upon different portions of said chart, and means controlled by relative displacement of said elements for disclosing an image of that portion of said chart which is so illuminated.

22. An apparatus for measuring space dimensions of objects and comprising in combination, a plurality of relatively movable elements between which objects to be measured are placed, a stationary chart, a stationary reading line spaced from said chart, and means controlled by relative displacement of said elements for causing apparent movement of said chart across said reading line in accordance with varying dimensions of objects being measured.

In testimony whereof I hereto affix my signature.

ROBERT CRAIG.